Sept. 27, 1938. E. F. KOHL 2,131,628
ELECTRIC VIBRATING MECHANISM
Filed April 2, 1936
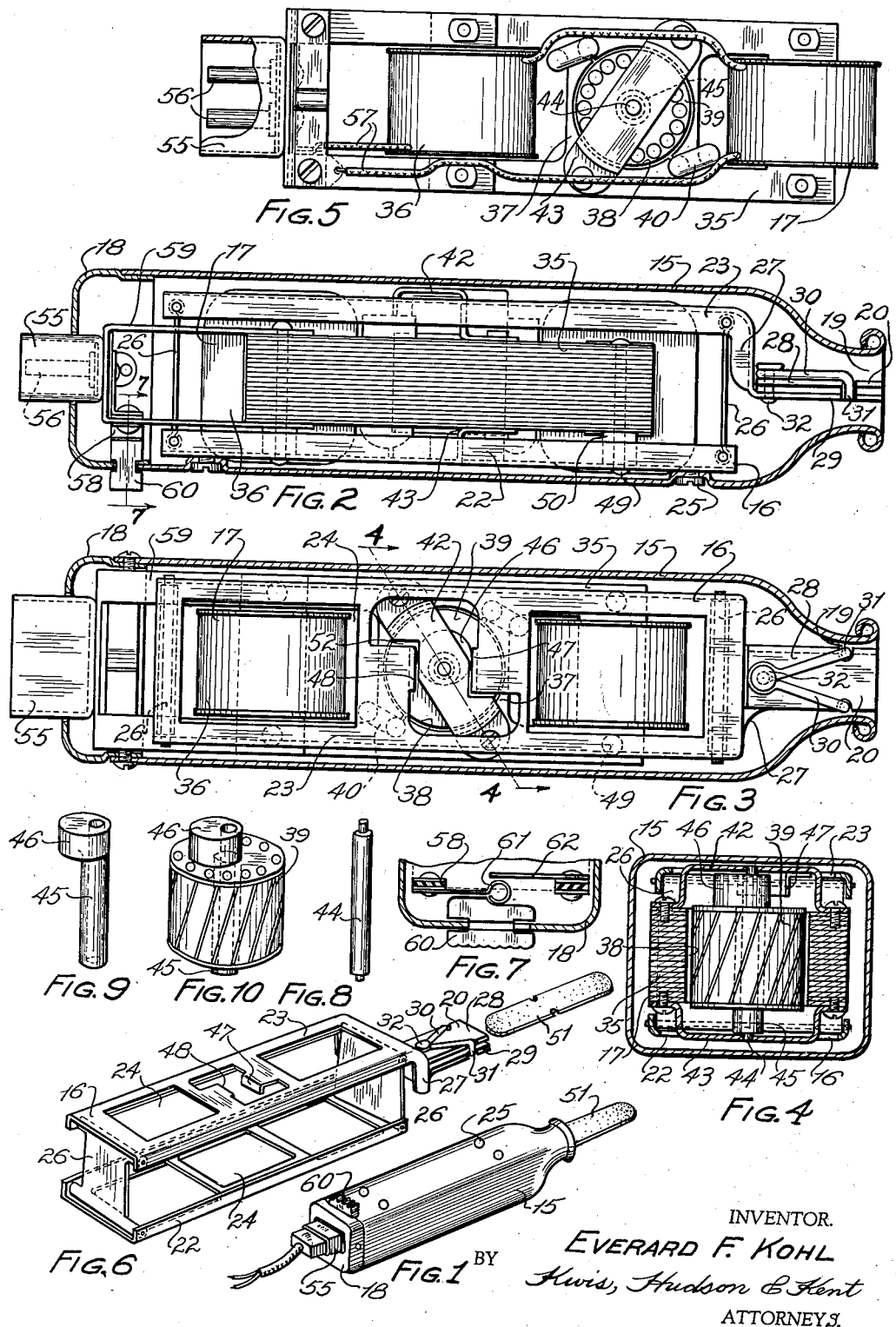
INVENTOR.
EVERARD F. KOHL
BY Kwis, Hudson & Kent
ATTORNEYS.

Patented Sept. 27, 1938

2,131,628

UNITED STATES PATENT OFFICE 2,131,628

ELECTRIC VIBRATING MECHANISM

Everard F. Kohl, Cleveland, Ohio, assignor to Selco Products, Inc., Cleveland, Ohio, a corporation of Ohio Application April 2, 1936, Serial No. 72,384

10 Claims. (Cl. 132—74)

This invention relates to an improved device for operating various individual tools or implements such as manicuring implements, an engraving tool, a dental tool, or the like.

An object of the invention is to provide an improved electrically driven tool operating device which is self-contained and adapted to be conveniently held in the hand of the operator.

Another object of the invention is to provide an improved device, of this character, having an elongated casing of a size and shape to be conveniently held in the hand and having a correspondingly elongated electric motor contained in the casing and with which the desired tool may be operably connected.

Still another object of this invention is to provide an improved device, of the type mentioned, having an elongated casing containing a correspondingly elongated electric motor and wherein a member adapted to be moved longitudinally within the casing by the motor has tool connecting means disposed adjacent an opening of the casing.

Yet another object of this invention is to provide an improved device of this type wherein the longitudinally movable member is disposed between the motor and a wall of the casing and the motor armature extends transversely with respect to the axis of the casing and has driving connection with the movable member.

It is also an object of this invention to provide an improved tool operating device having spaced elongated members, one of which has connecting means for a tool to be operated and is connected with the other member for movement relative thereto, and wherein an elongated electric motor disposed between the members is provided with a rotary armature having a drive connection with the movable member.

It is a further object of this invention to provide an improved tool operating device, of the type referred to, wherein the elongated movable member has spaced bearing elements thereon and the armature of the motor drives an eccentric which engages such bearing elements.

Other objects and advantages of the invention will be apparent from the following description when taken in conjunction with the accompanying sheet of drawings wherein Fig. 1 is a perspective view showing my improved device with a tool connected for actuation thereby;

Fig. 2 is a side elevation of the device with the casing broken away to show the motor and motor support therein;

Fig. 3 is a plan view of the device with the casing broken away to show the motor and motor support;

Fig. 4 is a transverse sectional view taken through the device as indicated by line 4—4 of Fig. 3;

Fig. 5 is a bottom plan view of the motor in detached relation;

Fig. 6 is a perspective view showing the motor support and a tool ready to be moved into engagement with the tool connecting means;

Fig. 7 is a partial sectional view taken on line 7—7 of Fig. 2 to illustrate the motor control switch;

Fig. 8 is a perspective view showing the armature shaft in detached relation;

Fig. 9 is another perspective view showing the armature bushing and eccentric; and Fig. 10 is a perspective view showing the armature with the bushing and eccentric assembled thereon.

More detailed reference will now be made to the accompanying drawing wherein I have illustrated an improved electrical device for operating any one of a variety of individual tools, such as manicuring implements or the like, which in ordinary use are usually operated with short relatively rapid strokes. Before proceeding with such more detailed description, however, it should be understood that the drawing is to be regarded as illustrative only and that the invention may be embodied in various other constructions and devices.

My improved device, as has already been indicated, may be used for operating small tools, such as manicuring implements and the like, and for the convenience of the operator and other reasons, I construct the device of such size and shape that it can be readily held in the hand of the operator. As shown in the drawing the device may comprise an elongated casing 15 of rectangular or other desired cross-section in which the motor support 16 and motor 17 are contained. The casing may be of sheet metal or other suitable construction and may be provided at one end with a cover 18, the removal of which permits the insertion or removal of the motor and motor support. At its opposite end the casing has an opening 19 through which the tool to be operated may be inserted for engagement with a tool holding chuck or connecting means 20.

The support 16 may be a frame-like structure comprising a pair of elongated members 22 and 23 in spaced substantially parallel relation and between which the motor 17 is received. As best shown in Fig. 6 of the drawing, the members 22 and 23 may be of stamped sheet metal construction, each member being of generally flat shape but having the side edges thereof deflected to form longitudinally extending reenforced angular corners. Both of these members may have openings 24 therein which accommodate projecting structural portions of the motor. The member 22 may be connected with one wall of the casing 15 as by suitably located screws 25, and the member 23 may be connected with the member 22 so as to be movable relative thereto, preferably having a translatory movement which in this instance is a movement substantially in the direction of the axis of the casing. Connecting means suitable for this purpose may be in the form of links 26 having pivotal connection with the members 22 and 23 adjacent their ends.

To provide for connection of the tool to be operated with the longitudinally movable member 23 I provide the latter with an angular portion 27 at one end thereof. This angular portion 27 with which the tool connecting chuck or means 20 is connected, extends toward the member 22 a distance sufficient to permit the chuck to be located adjacent the opening 19 and substantially on the longitudinal axis of the casing. The tool holding chuck 20 may be of any suitable construction or form and, as shown in this instance, may comprise spaced plate members 28 and 29 and a retaining spring 30 having fingers 31 engaging in openings provided in opposite edges of the plate members. The plate member 29 may, if desired, be an integral part of the angular extension of the member 23, and the spring 30 and the plate member 28 may be connected therewith by a rivet 32 or the equivalent.

The electric motor 17, which supplies the power for the operation of the tool, is elongated in corresponding relation to the elongated casing 15 and motor support 16. This motor may have an elongated frame 35, of laminated construction, adjacent the ends of which are mounted suitable field coils or windings 36 in surrounding relation to portions of the frame. At a point intermediate the field coils 36 the frame is provided with transverse portions forming opposed poles 37 and an opening 38 between the poles and in which a suitable rotary armature 39 is operable. This motor may be of the type known as a "shaded pole" motor so that it will have self-starting characteristics when operated on alternating current from the ordinary domestic lighting circuit. To this end the motor may include suitably constructed and located "shading" coils 40 which produce the desired pole-shading effect.

This mounting means may include a pair of brackets 42 and 43 on the frame at opposite ends of the armature opening 38, and a shaft 44 which extends through the armature opening and has its ends non-rotatably mounted in the brackets. The armature 39, which may be of any suitable construction, is provided with a central opening in which a bushing or sleeve 45 is pressed or otherwise fitted. The armature is rotatably mounted on the shaft 44 with the bushing 45 thereof having bearing surface of substantial area in engagement with the shaft.

A drive connection between the armature 39 and the tool operating member 23 may be established in various ways but I find that a very satisfactory drive connection may be obtained by providing the armature with a cam, preferably in the form of an eccentric 46, which cooperates with spaced bearing elements on the tool operating member. The eccentric 46 may, if desired, be formed integral or connected with the bushing 45 so that, when the latter is connected with the armature, the bushing will be connected therewith also. The bearing elements of the tool operating member 23 may be in the form of a pair of longitudinally spaced, inwardly deflected integral lugs 47 and 48 which are engaged by substantially diametrally opposed portions of the eccentric. I prefer to construct the bushing 45 and the eccentric 46 of lubricating metal, that is, of metal having self-lubricating or lubricant-bearing characteristics.

As mentioned above, the motor 17 is received between the spaced members 22 and 23 of the motor support 16 and, if desired, it may be connected with the member 22 by suitable rivets 49 or the like which extend through this member and through the laminated frame 35. Suitable spacing bushings 50 may be provided on the rivets between the motor frame and the member 16. When the motor is thus supported between the members 22 and 23 the eccentric 46 extends into the space between the lugs 47 and 48 so that, upon rotation of the armature and eccentric, the member 23 will be reciprocated longitudinally within the casing. Such reciprocation of the tool operating member 23 imparts movement to the tool or implement held by the chuck 20 which, as illustrated in Figs. 1 and 6, may be a manicurist's emery board 51 or other implement. To permit the eccentric 46 to cooperate in the desired manner with the bearing elements 47 and 48, the bracket 42 may have opposed clearance recesses or notches 52 formed in the edges thereof. It will be understood, of course, that the extent of movement or stroke of the tool will ordinarily be determined by the eccentricity of the member 46 and that the stroke may be varied as desired by correspondingly varying the characteristics of this member.

For supplying energizing current to the electric motor 17, I may provide the device with a suitable plug receptacle 55 having a pair of contacts 56 which are connected with terminal wires 57 of the motor through a control switch 58. The plug receptacle 55 and the switch 58 may, if desired, be mounted upon a suitable bracket 59 which is connected with the motor frame and extends toward the open end of the casing 15. The control switch 58 may comprise an actuating member 60 slidable in a slot of the cover 18 and adapted to deflect a resilient contact 61 into engagement with a second resilient contact 62. As shown in Fig. 2, the plug receptacle 55 may extend into or through an opening of the cover 18 so that the contacts 56 thereof, as well as the switch actuating member 60, will be accessible from the exterior of the casing.

From the foregoing description and the accompanying drawing it will now be readily understood that I have provided an improved device for operating individual tools such as manicuring implements, dental tools, or the like, and that the device is of relatively small, compact form and of a size and shape to be conveniently held in the hand of the operator. It will be further understood that this tool operating device embodies an elongated electric motor of reduced size which is of novel construction and which is capable of large power output in proportion to its size. It will also be readily understood that I have provided a novel arrangement for mounting the electric motor and utilizing the rotary movement of its armature for actuating the desired tool.

While I have illustrated and described the device of my invention in a somewhat detailed manner, it will be understood, of course, that I do not wish to be limited to the precise details of construction and arrangements of parts herein disclosed, but regard my invention as including such changes and modifications as do not involve a departure from the spirit of the invention and the scope of the appended claims.

Having thus described my invention, I claim:

1. In combination, a pair of spaced members one of which is provided with means for connecting therewith a tool to be operated, means pivotally connecting said one member for movement relative to the other member, and an electric motor positioned between said members and having an operating connection for driving the relatively movable member.

2. In combination, a pair of spaced elongated members one of which is provided with means for connecting therewith a tool to be operated, a pair of links connecting said members and providing for translatory movement of one of the members, and a correspondingly elongated electric motor between said members and having driving connection with the movable member.

3. In combination, a pair of spaced elongated members one of which is provided with means for connecting therewith a tool to be operated, a pair of links connecting said members and providing for movements of one of the members substantially in the direction of its axis, said one member having spaced bearing elements thereon, a correspondingly elongated electric motor disposed between said members, and a rotary actuating member driven by the motor and engaging said bearing elements.

4. In combination, a pair of spaced generally flat elongated members, a pair of relatively wide links pivotally connecting said members and providing for translatory movement of one member relative to the other, and a correspondingly elongated electric motor positioned between said members and having driving connection with the translatory member.

5. In combination a pair of elongated sheet metal members one of which is provided with means for connection with a tool to be operated, means connecting said members in spaced relation and providing for movement of said one member substantially in the direction of its axis, said one member having longitudinally spaced bearing portions extending substantially normal to its axis, a correspondingly elongated electric motor disposed between said members and having an armature extending transversely with respect to the axes thereof, and an eccentric having driving connection with said armature and engaging said bearing portions.

6. In combination, an elongated casing, a support in said casing comprising a pair of spaced elongated members one of which is connected with the casing and the other of which has translatory movement in the casing, and an elongated electric motor positioned between said members and connected with said one member, said motor having a rotary actuating member cooperating with said other member for imparting translatory movement thereto.

7. In combination an elongated casing, a support in said casing comprising spaced elongated substantially flat members disposed adjacent opposite walls of the casing, one of said members being connected to the adjacent wall of the casing, a pair of links connecting the other member with said one member for translatory movement, said other member having thereon a pair of spaced bearing lugs, and an elongated electric motor positioned between said members and anchored to said one member, said motor having a rotary armature extending transversely with respect to the longitudinal axis of the casing and an eccentric in driving engagement with said bearing lugs.

8. In combination an elongated casing of size adapted to be conveniently held in the hand, said casing having an opening adjacent one end thereof, an elongated member movable longitudinally within the casing and having tool connecting means accessible through said opening, an elongated motor in the casing having a rotating armature extending transversely with respect to the axis of the casing, and means establishing a driving connection between the armature and said member for reciprocating the latter.

9. In combination a casing having an opening thereinto, a support in said casing comprising a pair of spaced members one of which has tool connecting means adjacent said opening, said one member being connected with the other member for movement relative thereto, an electric motor disposed between said members with its armature extending transversely thereto, and eccentric means driven by the armature and engaging said one member to cause oscillation thereof.

10. In combination, an elongated casing having an opening adjacent one end thereof, an elongated member movable longitudinally in the casing and having tool connecting means adjacent said opening, a correspondingly elongated electric motor disposed between said member and a wall of the casing with its armature extending transversely of the casing, and an eccentric providing an operating connection between the armature and said member.

EVERARD F. KOHL.